(No Model.) 2 Sheets—Sheet 2.

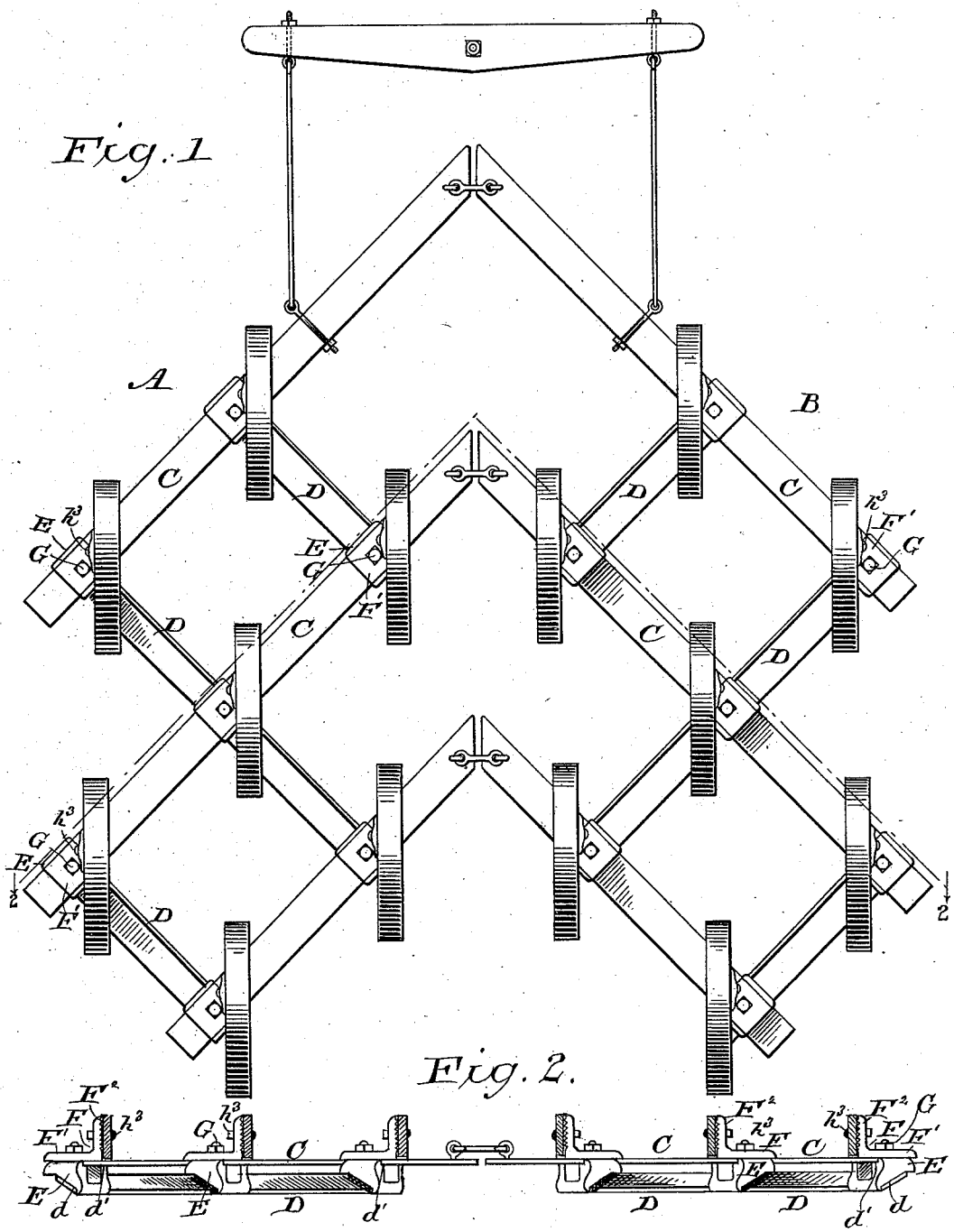

G. SWEET.
HARROW.

No. 402,629. Patented May 7, 1889.

Witnesses,
H. C. Newman
E. S. Newman

Inventor
George Sweet,
By Baldwin Davidson & Wright
Attorneys

UNITED STATES PATENT OFFICE.

GEORGE SWEET, OF DANSVILLE, NEW YORK.

HARROW.

SPECIFICATION forming part of Letters Patent No. 402,629, dated May 7, 1889.

Application filed January 24, 1889. Serial No. 297,353. (No model.)

*To all whom it may concern:*

Be it known that I, GEORGE SWEET, a citizen of the United States, residing in Dansville, in the county of Livingston and State of New York, have invented certain new and useful Improvements in Harrows, of which the following is a specification.

My invention relates to the class of spring-tooth harrows in which the harrow-frame is composed of two like sections flexibly connected and formed of tooth-bearing bars united and braced by cross-pieces, and in which the spring-metal teeth are adjustably secured to the frame.

My invention consists in forming each section of the frame of a series of straight horizontal tooth-bearing bars arranged at an angle to the line of draft and connected by cross-bars arranged at an opposite angle to the line of draft, inclined from their front edges rearwardly, and secured to the under sides of the tooth-bearing bars.

My invention also consists in improved means for securing together the tooth-bearing bars and the cross-bars, and for adjustably securing the spring-metal teeth to the frame.

Figure 6:
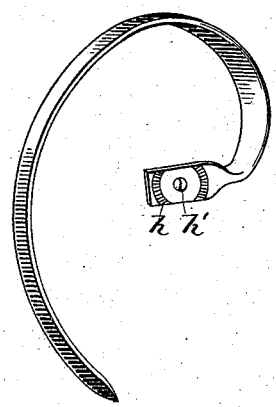
Figure 3:
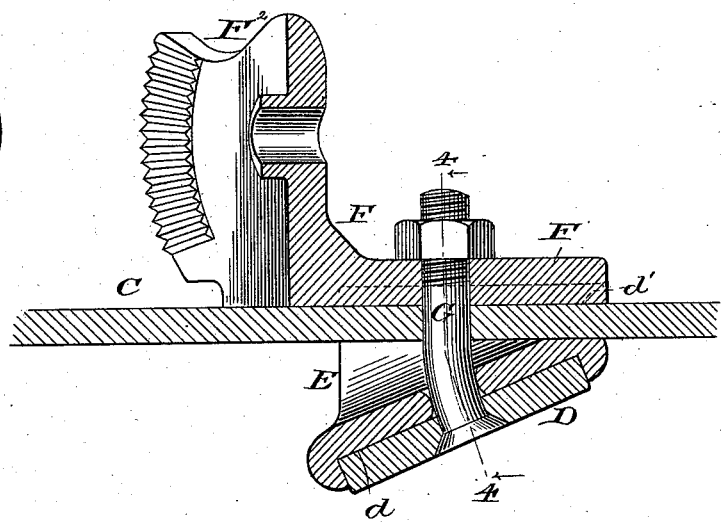
Figure 5:
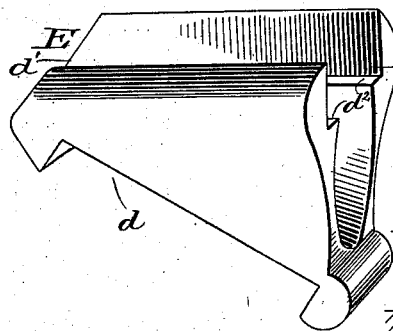
Figure 4:
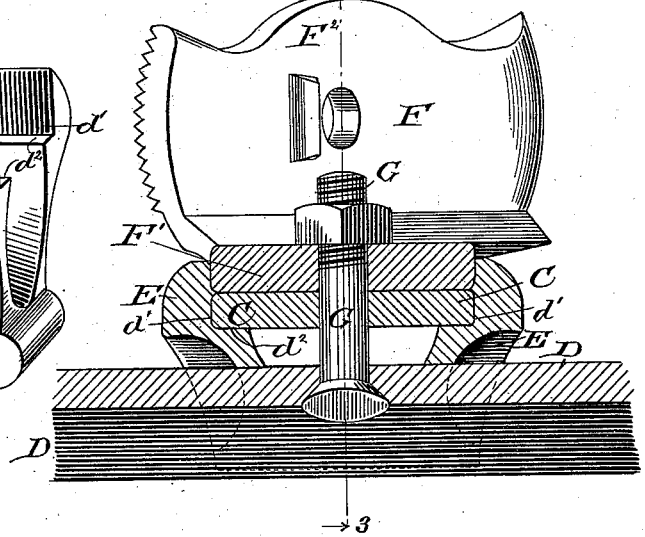

In the accompanying drawings, Figure 1 is a plan view of the harrow; Fig. 2, a cross-section on the line 2 2 of Fig. 1; Fig. 3, a vertical section of the chair, the cross-bars, and the tooth-supporting bracket on the line 3 3 of Fig. 4. Fig. 4 is a section on the line 4 4 of Fig. 3; Fig. 5, a perspective view of the chair, and Fig. 6 a perspective view of the tooth.

The frame of the harrow is composed of two like sections, A and B, flexibly connected in any suitable way. The frame in general outline is similar to those in ordinary use. The tooth-bearing bars C are preferably formed of straight flat metal bars arranged in parallel rows, as shown, extending rearwardly from the front end at an angle to the line of draft. The cross-bars D connect the tooth-bearing bars C, and are secured to the under sides of said bars, being arranged at an angle to the line of draft, and inclined from their front edges rearwardly, in order to move smoothly over the surface being cultivated and smooth down obstructions.

As will be noted, the cross-bars D are arranged at an angle to the line of draft opposite that of the tooth-bearing bars C and face inwardly toward the middle line of the harrow.

So far as part of my invention is concerned any suitable way of connecting the tooth-bearing bars to the cross-bars may be employed; but I prefer to connect them in the following manner: At each junction of the bars I provide a chair, E, the lower end of which is inclined correspondingly with the cross-bar and provided with a seat, $d$, in which the cross-bar rests. The upper end or top of the chair is provided with a seat, $d'$, arranged at right angles to the seat $d$, and having the bottom portion, $d^2$, in a horizontal plane. The main tooth-bearing bar C rests in this seat. The seat $d'$ is made sufficiently deep to accommodate the right-angular projecting arm $F'$ of the bracket F, to which the harrow-tooth is secured. A bolt, G, extends through the cross-bar D, chair E, tooth-bearing bar C, and the projecting arm $F'$ and secures all the parts together. On the arm $F'$ is mounted an upwardly-extending bracket-arm, $F^2$, to which the harrow-tooth is secured. The arm $F^2$ is arranged at an angle of about forty-five degrees to the tooth-bearing bar C, so that the harrow-tooth in operation is in line with the line of draft. The harrow-tooth is preferably of the form shown in the drawings—viz., twisted at its upper end and provided with serrations $h$ on opposite sides of the bolt-hole $h'$. The bracket-arm $F^2$ is provided with corresponding serrations, and a bolt, $h^3$, connects the tooth to the bracket. This form of connection is shown in my patent, No. 386,094, of July 10, 1888.

Having thus described my invention, what I claim is—

1. In a harrow-frame, the combination, substantially as hereinbefore set forth, of the flat horizontal tooth-bearing bars arranged at an angle to the line of draft and flexibly connected together at their inner ends, and the cross-bars secured to the under sides of the tooth-bearing bars and inclined from their front edges rearwardly.

2. The combination, substantially as hereinbefore set forth, of a series of flat horizontal tooth-bearing bars parallel with each other and extending at an angle to the line of draft from their front ends rearwardly and flexibly connected at their inner ends, and the cross-bars secured to the under sides of the tooth-bearing bars, arranged at right angles therewith, inclined from their front edges rearwardly and downwardly and facing inwardly.

3. The combination, substantially as hereinbefore set forth, of a horizontal tooth-bearing bar, a cross-bar inclined from its front edge rearwardly, a chair having an inclined seat in its under side for the cross-bar and a horizontal seat in its upper end for the tooth-bearing bar, and a bolt for connecting the bars with the chair.

4. The combination, substantially as hereinbefore set forth, of the tooth-bearing bar, the cross-bar, the chair having seats in its upper and lower sides for the bars, the tooth-supporting bracket having a horizontal arm resting in a seat of the chair above the tooth-bearing bar, and an upwardly-extending arm to which the tooth is secured.

5. The combination, substantially as hereinbefore set forth, of the tooth-bearing bar, the cross-bar, the chair to which said bars are secured, the harrow-tooth, the tooth-supporting bracket having a horizontally-extending arm secured to the chair, and an upwardly-extending serrated arm to which the harrow-tooth is secured and extending at an angle of about forty-five degrees to the tooth-bearing bar.

In testimony whereof I have hereunto subscribed my name.

GEORGE SWEET.

Witnesses:
ALBERT SWEET,
T. B. GRANT.